(12) United States Patent
Handanhal Ramachandra et al.

(10) Patent No.: US 11,698,487 B2
(45) Date of Patent: Jul. 11, 2023

(54) COMPACT MICRO ELECTRICAL MECHANICAL ACTUATED RING-RESONATOR

(71) Applicant: Cisco Technology, Inc., San Jose, CA (US)

(72) Inventors: Sujit Handanhal Ramachandra, Allentown, PA (US); Kirk L. Stechschulte, Vista, CA (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 17/453,780

(22) Filed: Nov. 5, 2021

(65) Prior Publication Data

US 2023/0145261 A1    May 11, 2023

(51) Int. Cl.
*G02B 6/12* (2006.01)
*G02B 6/293* (2006.01)

(52) U.S. Cl.
CPC ...... *G02B 6/12007* (2013.01); *G02B 6/29338* (2013.01); *G02B 2006/12107* (2013.01)

(58) Field of Classification Search
None
See application file for complete search history.

(56) References Cited

U.S. PATENT DOCUMENTS

| | | | |
|---|---|---|---|
| 6,411,752 B1 | 6/2002 | Little et al. | |
| 6,751,377 B2* | 6/2004 | Baumann | G02B 6/12007 385/32 |
| 6,909,824 B1* | 6/2005 | Messica | G02B 6/3536 385/27 |
| 7,113,663 B1* | 9/2006 | Spoonhower | G02B 6/12007 385/16 |
| 7,477,812 B2* | 1/2009 | Nielson | G02B 6/3584 385/16 |
| 9,341,779 B2* | 5/2016 | Tang | G02B 6/12007 |
| 9,891,382 B2* | 2/2018 | Duraffourg | G01G 3/165 |

(Continued)

FOREIGN PATENT DOCUMENTS

| | | | | |
|---|---|---|---|---|
| WO | WO-02082140 A1 * | 10/2002 | | G02B 6/29341 |
| WO | WO-2021066721 A1 * | 4/2021 | | G01N 21/35 |

OTHER PUBLICATIONS

Chollet, F. & de Labachelerie, Michel & Fujita, Hiroyuki. (1999). Compact evanescent optical switch and attenuator with electromechanical actuation. Selected Topics in Quantum Electronics, IEEE Journal of. 5. 52-59. 10.1109/2944.748105.

(Continued)

*Primary Examiner* — Jerry Rahll
(74) *Attorney, Agent, or Firm* — Patterson + Sherdan, LLP

(57) ABSTRACT

A compact micro electrical mechanical actuated ring-resonator includes a bus waveguide disposed on a platform; a ring resonator disposed on the platform, including at least a first optical coupler, wherein the ring resonator is optically coupled with the bus waveguide; and a selective waveguide disposed on a piezoelectric cantilever mounted in a trench defined in the platform, wherein the selective waveguide includes a second optical coupler and is controllable to selectively adjust a coupling ratio between the first optical coupler with the second optical coupler by physically changing a distance between the first optical coupler and the second optical coupler.

20 Claims, 9 Drawing Sheets

(56) References Cited

U.S. PATENT DOCUMENTS

| | | | | |
|---|---|---|---|---|
| 10,031,354 B2 * | 7/2018 | Vo | ............................ | G02F 1/025 |
| 10,261,260 B2 * | 4/2019 | Mir Shafiei | ........ | G02B 6/12007 |
| 2002/0039470 A1 * | 4/2002 | Braun | .................. | G02B 6/3536 |
| | | | | 385/27 |
| 2002/0076149 A1 | 6/2002 | Deacon | | |
| 2002/0172466 A1 * | 11/2002 | Baumann | ........... | G02B 6/12007 |
| | | | | 385/50 |
| 2004/0022474 A1 * | 2/2004 | Lim | ..................... | G02B 6/1223 |
| | | | | 385/4 |
| 2005/0074209 A1 * | 4/2005 | Baumann | ........... | G02B 6/12007 |
| | | | | 385/50 |
| 2005/0271324 A1 * | 12/2005 | Nielson | ................ | G02B 6/3536 |
| | | | | 385/39 |
| 2006/0222292 A1 * | 10/2006 | Spoonhower | ...... | G02B 6/29343 |
| | | | | 385/25 |
| 2011/0255822 A1 * | 10/2011 | Zheng | .................. | G02B 6/3536 |
| | | | | 385/16 |
| 2012/0063484 A1 | 3/2012 | Goddard et al. | | |
| 2014/0042307 A1 * | 2/2014 | Jeffery | ............... | G01N 21/7746 |
| | | | | 250/227.14 |
| 2018/0306976 A1 * | 10/2018 | Mirshafiei | ............ | G02B 6/2934 |
| 2020/0174186 A1 * | 6/2020 | Westerveld | ............ | G01D 5/268 |
| 2022/0334058 A1 * | 10/2022 | Ottonello Briano | ... | G01N 21/35 |

OTHER PUBLICATIONS

Errando-Herranz, Carlos & Niklaus, Frank & Stemme, Goran & Gylfason, Kristinn. (2015). Low-power microelectromechanically tunable silicon photonic ring resonator add-drop filter. Optics letters. 40. 3556-3559. 10.1364/OL.40.003556.

Ming-Chang M. Lee and Ming C. Wu, "Tunable coupling regimes of silicon microdisk resonators using MEMS actuators," Opt. Express 14, 4703-4712 (2006).

Kunhua Wen, Yihua Hu, Li Chen, Jinyun Zhou, Liang Lei, and Zhen Guo, "Design of an Optical Power and Wavelength Splitter Based on Subwavelength Waveguides," J. Lightwave Technol. 32, 3020-3026 (2014) [Abstract Only].

Rajib R. Ghosh, Janib Bashir, Smruti R. Sarangi, Anuj Dhawan, SpliESR: Tunable Power Splitter Based on an Electro-Optic Slotted Ring Resonator, Optics Communications, vol. 442, Dated: Jul. 1, 2019, pp. 117-122, ISSN 0030-4018, https://doi.org/10.1016/j.optcom.2019.02.070. (https://www.sciencedirect.com/science/article/pii/S0030401819301853) [Abstract Only].

* cited by examiner

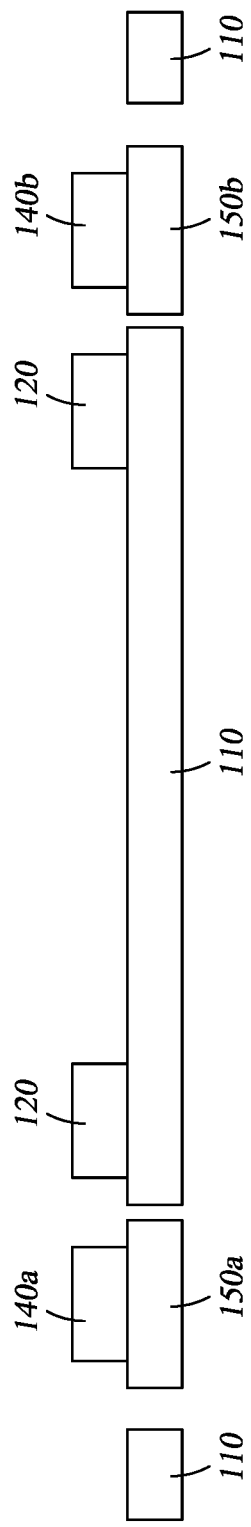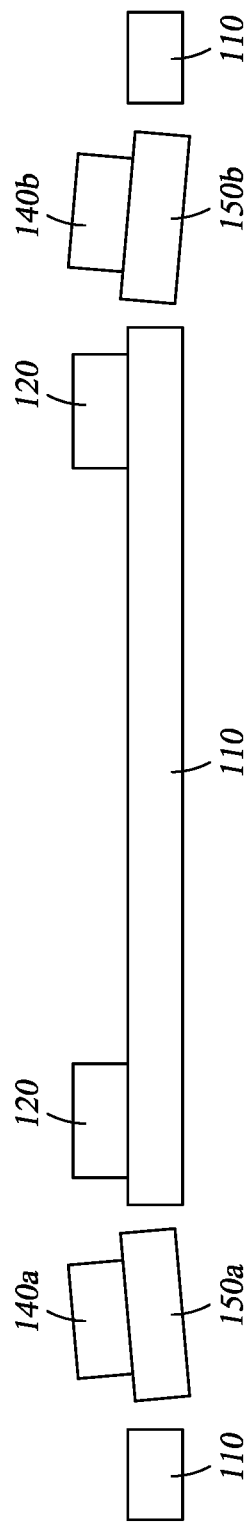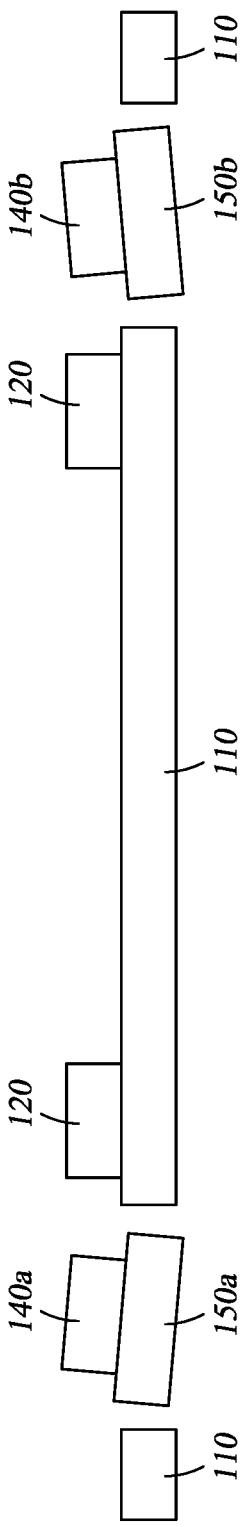

COMPACT MICRO ELECTRICAL MECHANICAL ACTUATED RING-RESONATOR

TECHNICAL FIELD

Embodiments presented in this disclosure generally relate to optical devices. More specifically, embodiments disclosed herein provide for optical power splitters, optical power combiners, and signal re-routers for optical signals using a ring resonator and selectively coupled waveguides controlled by mechanically actuated cantilevers.

BACKGROUND

Optical power splitters often use Y-branched designs, multi-mode interferometers (MMIs), and tap couplers (e.g., 2:1 splitters/combiners) to split optical power to multiple different waveguides, which are bulky, wavelength sensitive, and fixed in their splitting arrangement (e.g., 50:50, 60:40, 90:10). Accordingly, developers seeking to split or combine optical signals in a Photonic Integrated Circuit (PIC) often make compromises in the design and layout of the PIC to account for tolerance margins due to the fabrication techniques, thus resulting in over-engineered components that take up more space in the design, with little flexibility in reacting to changing signaling needs, and that require additional signal processing elements to support the optical splitter/combiner.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 5A-5F illustrate cross-sectional views of an optical device for splitting or combining optical signals in various configurations to selectively couple and decouple selective waveguides with a ring resonator, according to embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
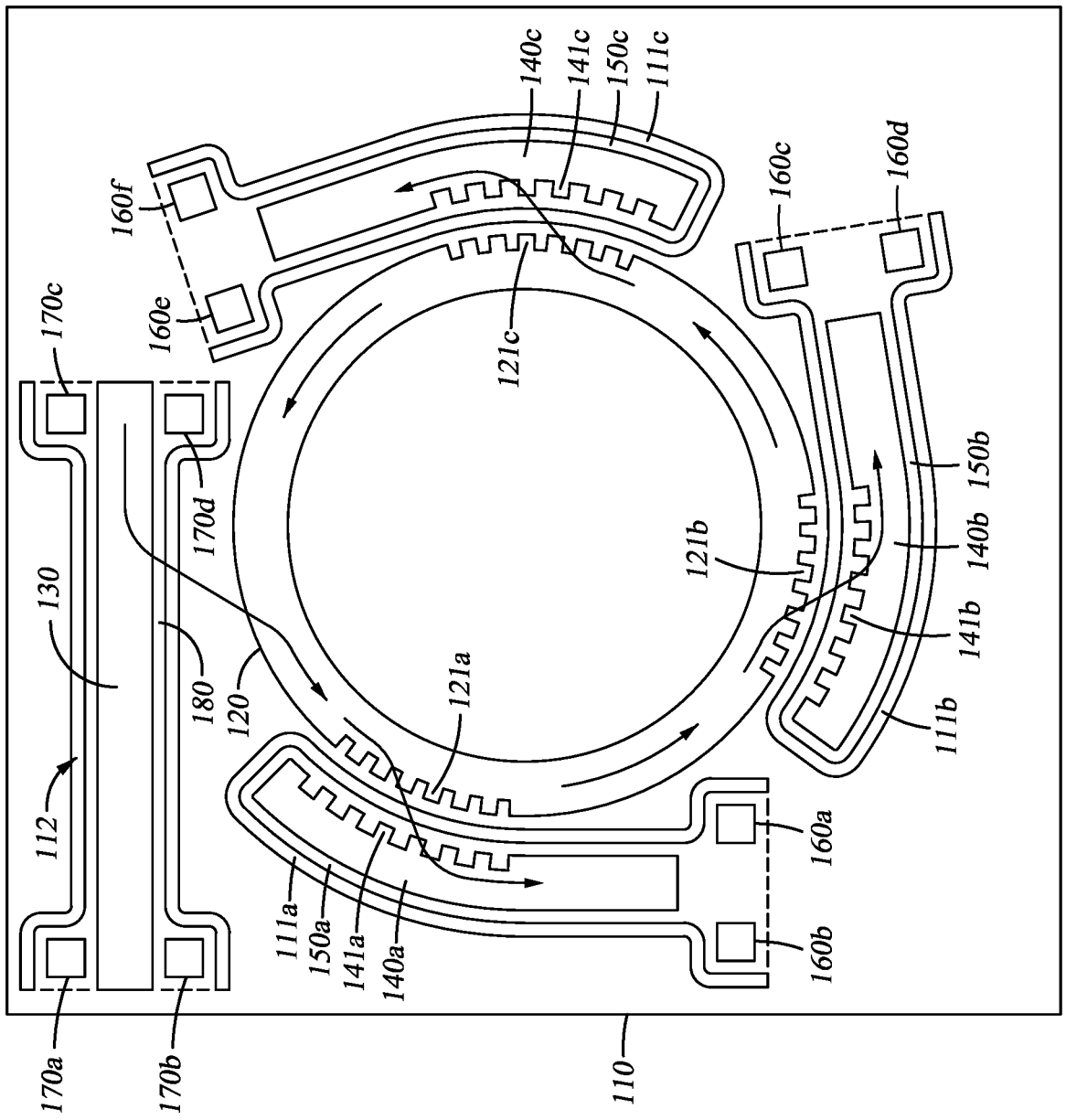
FIG. 1 illustrates a first layout of an optical device for splitting or combining optical signals, according to embodiments of the present disclosure.

One embodiment presented in this disclosure is a system, comprising: a bus waveguide disposed on a platform; a ring resonator disposed on the platform, including at least a first optical coupler, wherein the ring resonator is optically coupled with the bus waveguide; and a selective waveguide disposed on a piezoelectric cantilever mounted in a trench defined in the platform, wherein the selective waveguide includes a second optical coupler and is controllable to selectively adjust a coupling ratio between the first optical coupler with the second optical coupler by physically changing a distance between the first optical coupler and the second optical coupler.

One embodiment presented in this disclosure is a device, comprising: a platform, defining a first trench and a second trench; a first piezoelectric cantilever connected on one end to the platform within the first trench; a second piezoelectric cantilever connected on one end to the platform within the second trench; a ring resonator connected to the platform between the first trench and the second trench; a first selective waveguide disposed on the first piezoelectric cantilever and the platform; a second selective waveguide disposed on the second piezoelectric cantilever and the platform; and a bus waveguide disposed on the platform and optically coupled with the ring resonator.

One embodiment presented in this disclosure is an optical signal processor, comprising: a bus waveguide disposed in a first plane; a ring resonator disposed in the first plane and optically coupled with the bus waveguide, the ring resonator including a plurality of first optical couplers; and a plurality of selective waveguides, wherein each selective waveguide of the plurality of selective waveguides comprises: a second optical coupler corresponding to one first optical coupler of the plurality of first optical couplers; and a piezoelectric cantilever configured to adjust a relative alignment between the second optical coupler and the corresponding one first optical coupler to selectively adjust a coupling efficiency between each selective waveguide with the ring resonator.

Example Emodiments

The present disclosure provides systems and devices for optical signal processing that use smaller footprints on the photonic die (taking up less physical space), with less sensitivity to variations in signal wavelength, and with an adjustable splitting/combining arrangement (e.g., from X:Y, where X+Y=100%), among other benefits compared to previous optical power splitters, optical power combiners, and optical power re-routers (generally referred to as splitters, combiners, and re-routers or signal splitters, combiners, and re-routers). that will become apparent on a detailed examination of the present disclosure.

The systems and devices described herein use Micro-Electrical-Mechanical (MEM) actuation to physically change an alignment between two optical couplers (one in a waveguide and one in a ring resonator) to change how strongly coupled the waveguide is to the ring resonator. By including multiple such actuated waveguides, an operator can configure on the fly the splitting arrangement (e.g., how much of a split input signal waveguide one receives vs. waveguide two). Each of the waveguides are defined on piezoelectric cantilevers that can move up/down, left/right, or twist to change the alignment and/or distance between the ring and an associated waveguide, thereby changing how strongly the waveguide is coupled to the ring resonator.

Figure 2:
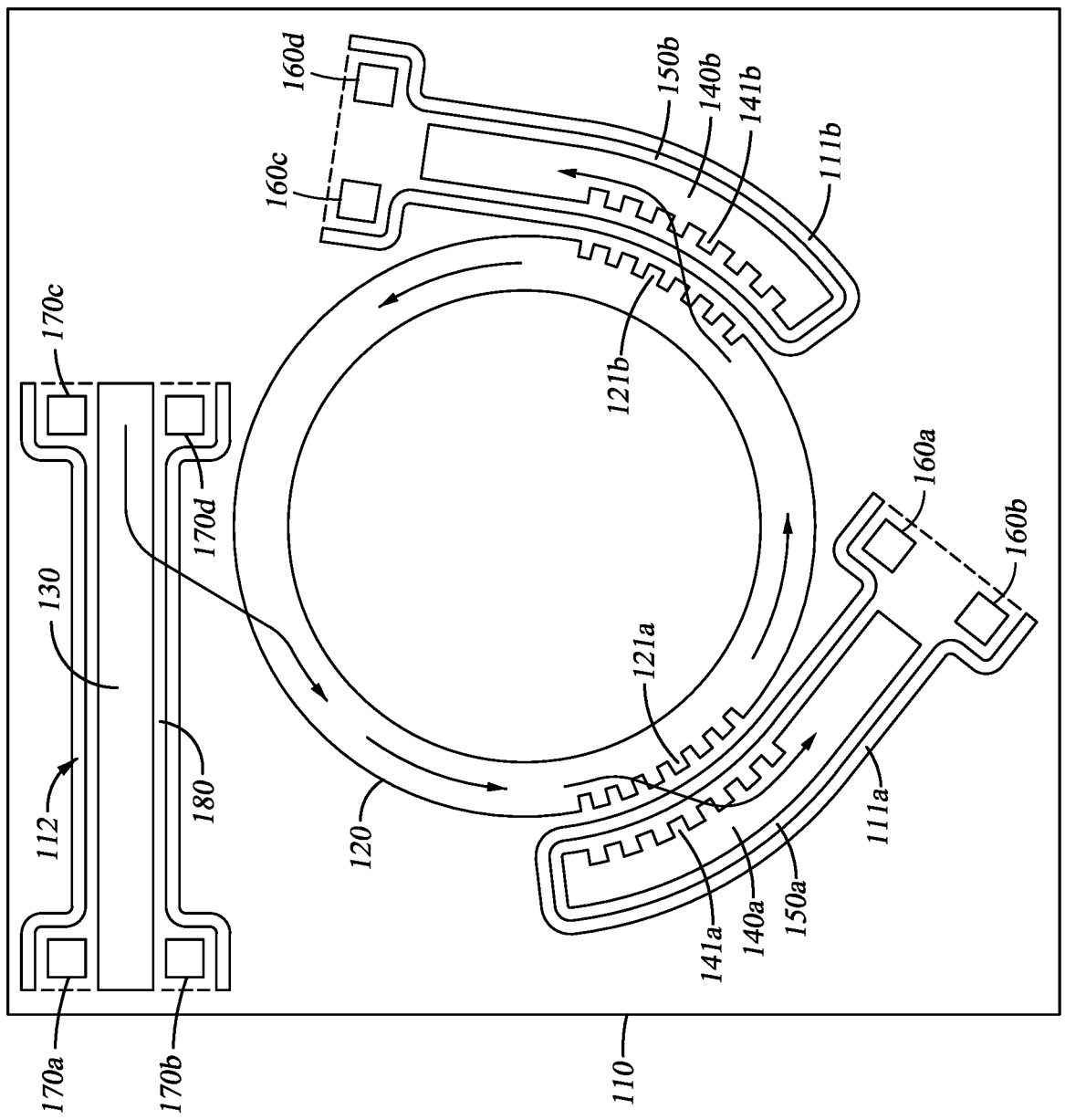
FIG. 2 illustrates a second layout of an optical device for splitting or combining optical signals, according to embodiments of the present disclosure.
Figure 3:
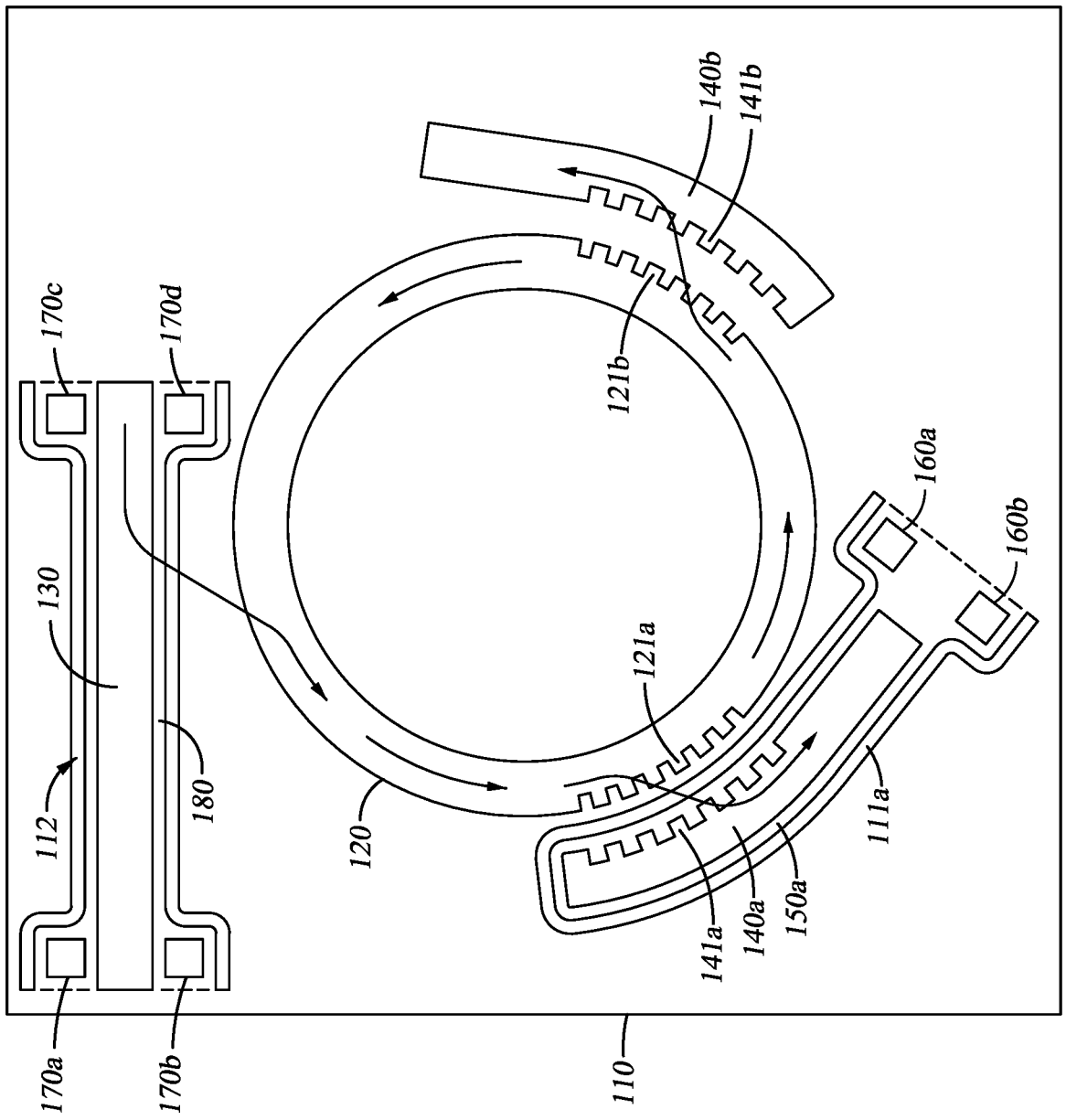
FIG. 3 illustrates a third layout of an optical device for splitting or combining optical signals, according to embodiments of the present disclosure.

FIG. 1 illustrates a first layout of an optical device for splitting or combining optical signals, according to embodiments of the present disclosure. FIG. 2 illustrates a second layout of an optical device for splitting or combining optical signals, according to embodiments of the present disclosure. FIG. 3 illustrates a third layout of an optical device for splitting or combining optical signals, according to embodiments of the present disclosure. Although the examples given herein generally related to one of splitting or combining optical signals, the described optical device may operate as an optical signal processor in either capacity based on the direction of signal flow through the optical device.

In each of FIGS. 1-3, a platform 110 of a photonic die is shown on which the other elements are grown or bonded. In various embodiments, the platform 110 may include one or more layers of a dielectric material, such as Silicon Carbide (SiC), III-V materials, Silicon Dioxide ($SiO_2$), etc., that the various other elements are fabricated on (e.g., via epitaxial growth) or affixed to (e.g., via an epoxy) after being fabricated elsewhere, and may include various layers of different materials grown or affixed to a base substrate.

A ring resonator 120 and a bus waveguide 130 are disposed on the platform 110, and are optically coupled with one another. In various embodiments, the bus waveguide 130 provides an input signal to the ring resonator 120 that is split as output signals to one or more selective waveguides 140a-c (generally or collectively, selective waveguide 140). Alternatively, the bus waveguide 130, receives and carries an output signal from the ring resonator 120 that is made of several input signals received from the one or more selective waveguides 140.

In various embodiments, the number and arrangement of the selective waveguides 140 included in the optical device can be different from what is shown in FIGS. 1-3. Accordingly, FIGS. 1-3 illustrate various layouts and numbers of the elements, which are provided as non-limiting examples of the optical device of the present disclosure.

In FIGS. 1 and 2, each selective waveguide 140a-c is disposed on a corresponding piezoelectric cantilever 150a-c (generally or collectively, piezoelectric cantilever 150) that is mounted, on a connected side, to the platform 110 in a corresponding trench 111a-c (generally or collectively, trench 111) defined in the platform 110. In various embodiments, such as with the second selective waveguide 140b in FIG. 3, one or more selective waveguides 140 may be mounted in a fixed position (e.g., as a fixed waveguide), and is disposed on the platform 110 rather than on a piezoelectric cantilever 150 in a trench 111. Additionally or alternatively, some or all of the trenches 111 may extend through each layer of the platform 110 or a subset of the layers of the platform 110 (e.g., the trenches 111 may define through holes or cavities closed on one end by a layer of the platform 110).

Several electrodes 160a-f (generally or collectively, electrode 160) are provided at the side of the associated piezoelectric cantilevers 150 mounted to the platform 110 to control an orientation and position of the associated piezoelectric cantilevers 150 relative to the ring resonator 120, as is discussed in greater detail in regard to FIGS. 5A-5F. The piezoelectric cantilevers 150 are made of various piezoelectric materials, including, but not limited to, quartz, Lithium Niobate ($LiNbO_3$), Lead Ziconate Titantate (PZT), Potassium Niobate ($KNbO_3$), Sodium Tungstate ($Na_2WO_3$), group III-V semiconductors, group II-VI semiconductors, etc., that move or deform when an electric field is applied by the electrodes 160.

The piezoelectric cantilevers 150 are mounted on one side to the platform 110 (e.g., a connected end) where the electrodes 160 are co-located, and have another end (e.g., a distal end to the connected end that is otherwise unconnected or held in free space) that is free to move based on the electrical fields imparted by the electrodes 160. When the electrodes 160 impart an electrical field to the piezoelectric cantilevers 150, the piezoelectric cantilevers 150 physically move (e.g., by pitching, yawing, or rotating) the selective waveguides 140 disposed thereon closer to or further from the ring resonator 120 to adjust a coupling strength between a given selective waveguide 140 and the ring resonator 120.

The ring resonator 120 includes a plurality of first optical couplers 121a-c (generally or collectively, first optical couplers 121) that correspond to the second optical couplers 141a-c (generally or collectively, second optical couplers 141).

As the corresponding couplers move closer to, further from, and in/out of alignment with one another based on the piezoelectric actuation of the piezoelectric cantilevers 150, an operator can adjust a coupling strength between the ring resonator 120 and one or more of the selective waveguides 140. Accordingly, the coupling ratio can be adjusted to account for manufacturing tolerances, changes in operational needs for power splitting ratios or power combining ratios. In various embodiments, the first optical couplers 121 and the second optical couplers are Distributed Bragg Gratings (DBG).

For example, when operating the optical device as a signal splitter, by changing the alignment and/or distance between a first corresponding pair of couplers (e.g., the first optical coupler 121a and the second optical coupler 141a of the first selective waveguide 140a) and leaving the alignment and/or distance between a second corresponding pair of couplers (e.g., the first optical coupler 121b and the second optical coupler 141b of the first selective waveguide 140b) unchanged, an operator can alter the splitting ratio. For example, a first selective waveguide 140a and a second selective waveguide 140b may each nominally receive half of the optical power of an input signal (e.g., a 50:50 split), but due to the optical power needs of downstream devices, manufacturing imperfections, etc., an operator can adjust the first selective waveguide 140a to receive a greater share of the optical power (e.g., a 60:40 split) or a lesser share of the optical power (e.g., a 30:70 split) that is different from the nominal split. The operator may move one or more of the selective waveguides 140 to change the splitting ratio between the selective waveguides 140. Additionally or alternatively, an operator may change the alignments and/or distances between two or more pairs of corresponding couplers at the same time to affect the relative coupling strengths of those pairs and any unchanged pairs.

In some embodiments, the coupling ratio with a given selective waveguide 140 may be set to zero, to thereby de-couple (at least temporarily) the given selective waveguide 140 from the ring resonator 120. For example, when the first selective waveguide 140a is connected to a first destination and the second selective waveguide 140b is connected to a second destination, an operator can selectively decouple one of the selective waveguides 140 from the ring resonator 120 to direct the optical signal to one of the first destination or the second destination. Accordingly, in some embodiments, the optical device may be operated as a signal router in addition to or instead of a signal splitter or combiner.

In various embodiments, the ring resonator 120, the bus waveguide 130, and the selective waveguides 140 may be made of various materials for directing light along a defined pathway, including, but not limited to, Silicon (Si) and Silicon Nitride (SiN). Additionally, although not illustrated, the bus waveguide 130 and the selective waveguides 140 may be connected to other waveguides or continue past where the individual elements are shown in the Figures to further directed optical signals to the ring resonator 120 or away from the ring resonator 120.

In various embodiments, the bus waveguide 130 may be mounted to the platform 110 as a static waveguide, or may be mounted to a carrier 180 disposed in a carrier trench 112 defined in some or all of the layers of the platform 110 to allow for adjustable coupling strength with the ring resonator 120. In various embodiments, the carrier 180, like the piezoelectric cantilevers 150, is made of a piezoelectric material that allows for various bus electrodes 170a-d (generally or collectively, bus electrodes 170) to impart an electrical field to physically move the carrier 180 (e.g., by pitching or rotating) and thereby adjust the bus waveguide 130 to be closer or further from the ring resonator 120. In various embodiments, bus waveguide 130 may be evanescently coupled with the ring resonator 120 (as is illustrated in FIGS. 1-3) or may be coupled via additional pairs of optical couplers like the selective waveguides 140 are couple with the ring resonator 120.

Although each of FIGS. 1-3 illustrate the respective selective waveguides 140 and piezoelectric cantilevers 150 as having curved sections (where the second optical couplers 141 are located) that are concentric to the ring resonator 120 (e.g., where the curvature of the selective waveguides 140 and piezoelectric cantilevers 150 are matched to an outer curvature of the ring resonator 120), the selective waveguides 140 and piezoelectric cantilevers 150 may have various shapes including straight-side quadrilaterals. Similarly, although each of FIGS. 1-3 illustrate the respective selective waveguides 140 and the bus waveguide 130 as being evenly spaced around the ring resonator 120 (e.g., at approximately (±5%) the same arc distance clockwise and counterclockwise to the adjacent coupling locations), in some embodiments, the waveguides may be unevenly spaced around the ring resonator 120. In various embodiments, the initial distance between the waveguide/cantilever and the ring resonator 120 can also be different in a given fabricated device and across devices to provide a "bias" point for further tuning.

Figure 4:
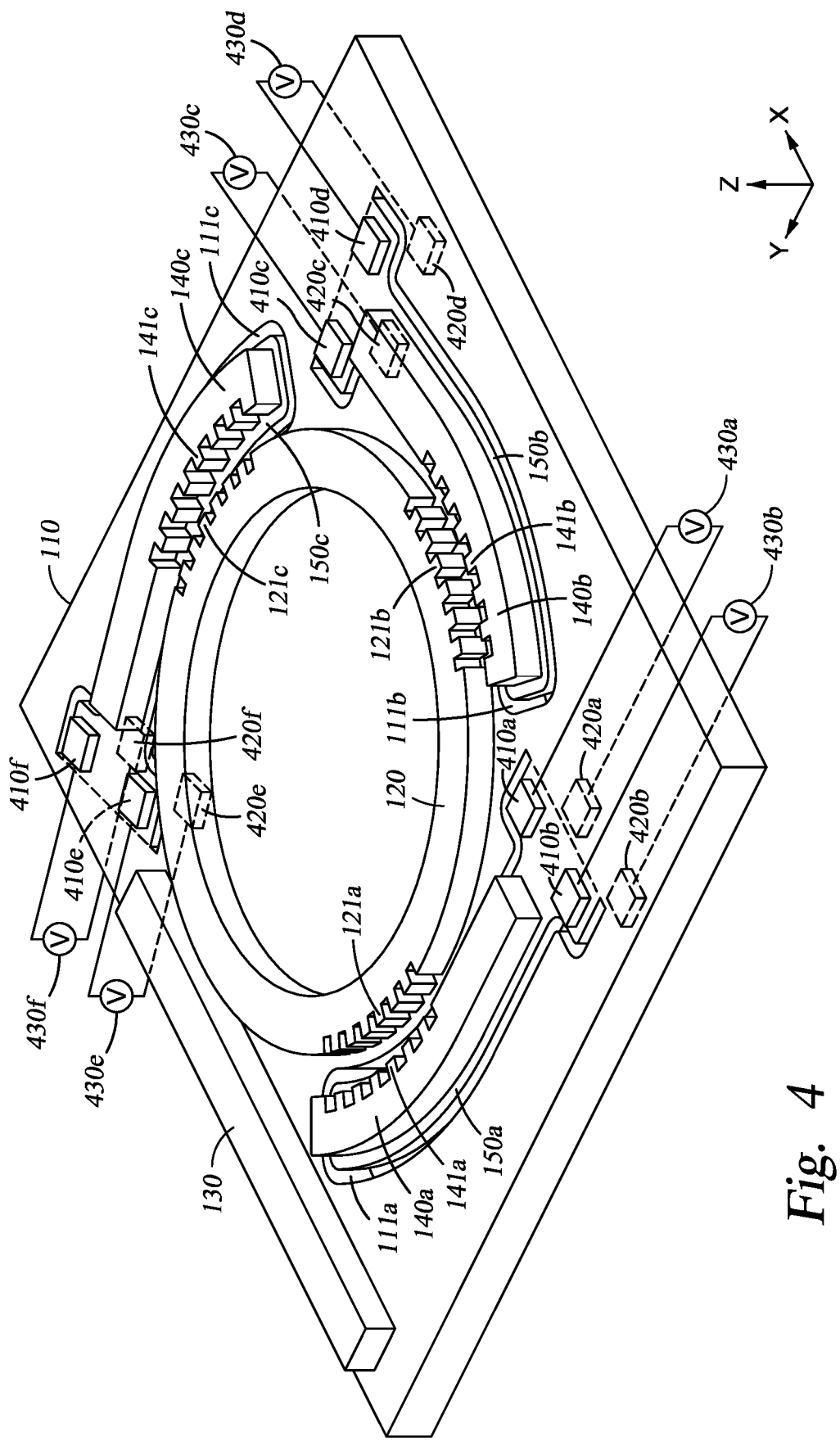
FIG. 4 illustrates details of the piezoelectric cantilever for an optical device for splitting or combining optical signals, according to embodiments of the present disclosure.

FIG. 4 illustrates details of the piezoelectric cantilever 150 for an optical device for splitting or combining optical signals, according to embodiments of the present disclosure. The optical device illustrated in FIG. 4 includes three piezoelectric cantilevers 150a-c, similarly to the layout illustrated in FIG. 1, although more or fewer piezoelectric cantilevers 150 may be included in other layouts.

Each piezoelectric cantilever 150 is attached to the platform 110 at one end, and has a free end at the opposite side that is configured to move the second optical coupler 141 of the selective waveguide 140 associated with that piezoelectric cantilever 150 relative to the corresponding first optical couplers 121 of the ring resonator 120.

Various cathodes 410a-f (generally or collectively, cathodes 410) and anodes 420a-f (generally or collectively, anodes 420) form electrode pairs (e.g., a first cathode 410a and a first anode 420a are first electrodes 160a). These electrode pairs apply a voltage supplied from a corresponding voltage source 430a-f (generally or collectively voltage source 430) to cause the piezoelectric cantilever 150 to deflect, bend, or twist. The electrode pairs produce an electric field in the piezoelectric cantilever 150 that causes the deflectable/bendable/twistable piezoelectric cantilever 150 to physically change location from a base state, and thereby move the optical couplers relative to one another.

Figure 9:
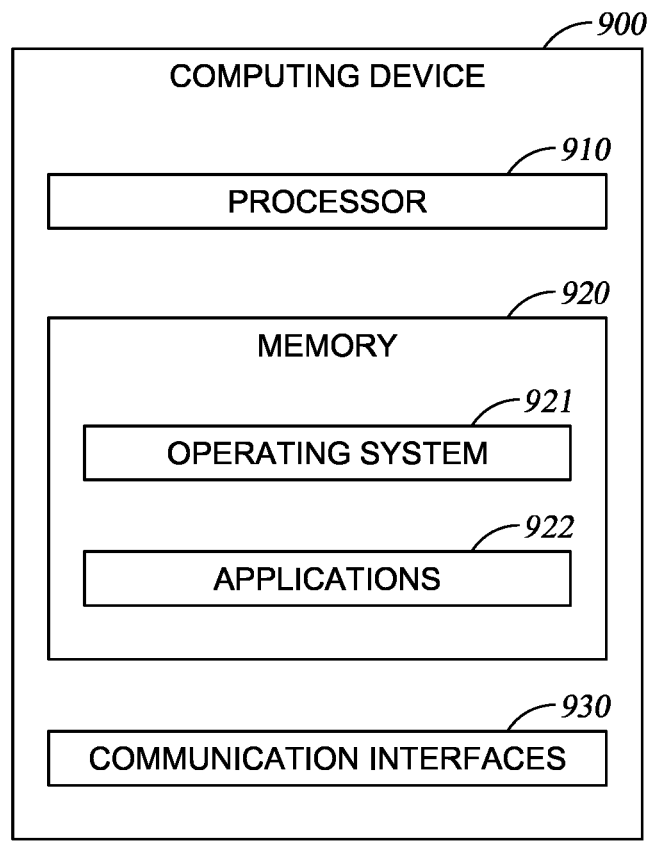
FIG. 9 illustrates hardware of a computing device, according to embodiments of the present disclosure.

In various embodiments, the voltage sources 430 may be set to a given value during test and calibration by a test and calibration system external to the optical device including the voltage sources 430 that is removed after test/calibration are complete, such as computing device 900 described in relation to FIG. 9. In some embodiments, a microcontroller, such as computing device 900 described in relation to FIG. 9, that is part of the optical device or otherwise connected to the optical device during regular operations (e.g., after test/calibration) may maintain the set voltage values or adjust the voltage values occasionally to alter the position of the piezoelectric cantilevers 150 to maintain a desired splitting or combining ratio, or change the desired splitting or combining ratio.

Each of the pairs of electrodes (e.g., paired cathodes/anodes 410/420) may be controlled separately from one another by individually controlling the voltage supplied by the corresponding voltage source 430. For example, when applying a voltage of X via the first voltage source 430a to the first cathode 410a and first anode 420a and a voltage of 2X via the third voltage source 430c to the third cathode 410c and third anode 420c, and operator may cause (ceteris paribus) greater movement in the second piezoelectric cantilever 150b than in the first piezoelectric cantilever 150a. In various embodiments, the relative orientations of some or all the cathodes 410 and the anodes 420 above or below the platform 110 may be reversed from what is illustrated in FIG. 4.

FIGS. 5A-5F illustrate cross-sectional views of an optical device for splitting or combining optical signals in various configurations to selectively couple and decouple selective waveguides 140 with a ring resonator 120, according to embodiments of the present disclosure.

Figure 5A:
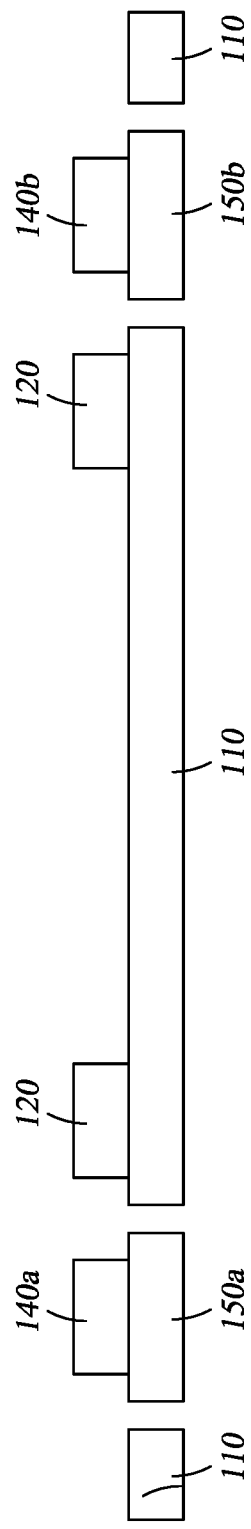

FIG. 5A illustrates a first state of the piezoelectric cantilevers 150 that evenly positions a first selective waveguide 140a and a second selective waveguide 140b relative to the ring resonator 120. The piezoelectric cantilevers 150 are shown in-plane with the platform 110 and in the middle of the void defined in the platform 110. In various embodiments, FIG. 5A may represent a "resting" or "base" state for the piezoelectric cantilevers 150 when no electric field is applied by the electrodes 160. The discussion of FIGS. 5B-5F use FIG. 5A as a base state as a point of comparison for the purpose of highlighting the different positions shown in FIGS. 5A-5F that the piezoelectric cantilevers 150 can move between. However, the piezoelectric cantilevers 150 may be constructed to be in various positions as a resting state or base state.

Figure 5B:
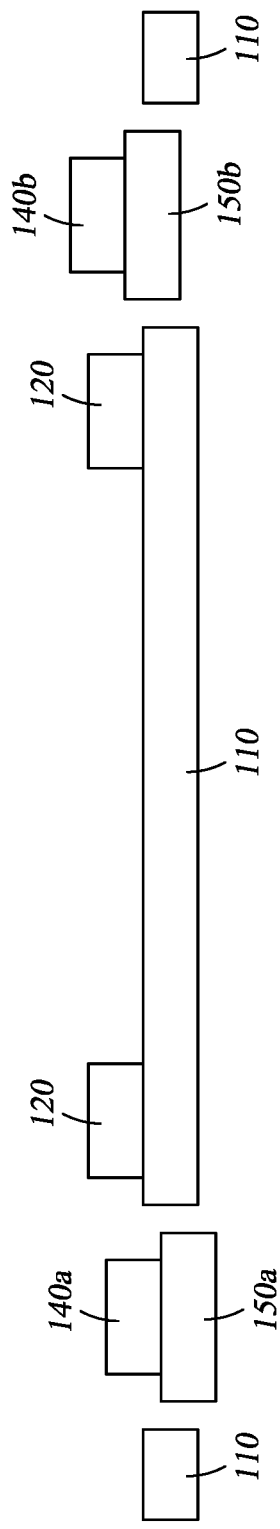

FIG. 5B illustrates a second state of the piezoelectric cantilevers 150 in which the first piezoelectric cantilever 150a is pitched downward from the plane of the platform 110 and the second piezoelectric cantilever 150b is pitched upward from the plane of the platform 110 relative to FIG.

5A. When pitching the piezoelectric cantilevers 150, the electrodes 160 apply an electric field that adjusts the relative alignment and/or distance between the respective optical couplers by causing the respective piezoelectric cantilever 150 to move a free distal end of the piezoelectric cantilever 150 away from the plane of the platform 110 relative to the end of the piezoelectric cantilever 150 connected to the platform 110, effectively moving far end of the piezoelectric cantilever 150 up or down in the Z direction.

Figure 5C:
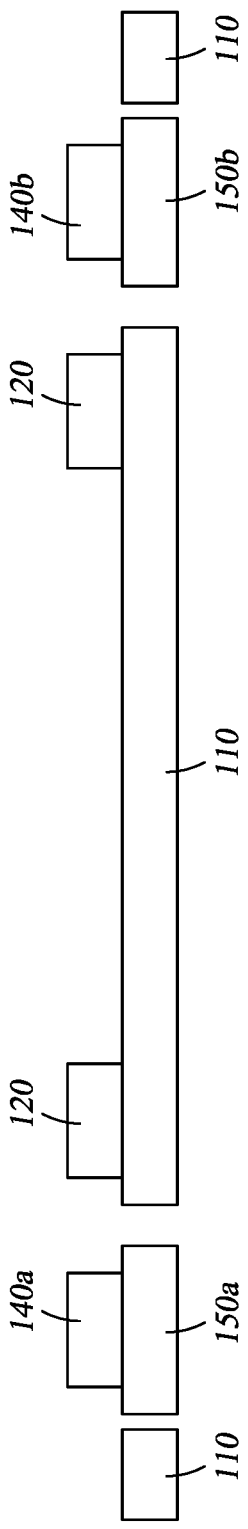

FIG. 5C illustrates a third state of the piezoelectric cantilevers 150 in which the first piezoelectric cantilever 150a and second piezoelectric cantilever 150b are yawed outward from the ring resonator 120 (relative to FIG. 5A) while remaining in the plane of the platform 110. Similarly, FIG. 5D illustrates a fourth state of the piezoelectric cantilevers 150 in which the first piezoelectric cantilever 150a and second piezoelectric cantilever 150b are yawed inward towards the ring resonator 120 (relative to FIG. 5A) while remaining in the plane of the platform 110. When yawing the piezoelectric cantilevers 150, the electrodes 160 apply an electric field that adjusts the relative alignment and/or distance between the respective optical couplers by causing the respective piezoelectric cantilever 150 to move a free distal end of the piezoelectric cantilever 150 within the plane of the platform 110 relative to ring resonator 120, effectively moving far end of the piezoelectric cantilever 150 left or right in the X direction.

FIG. 5E illustrates a fifth state of the piezoelectric cantilevers 150 in which the first piezoelectric cantilever 150a and second piezoelectric cantilever 150b are rolled outward from the ring resonator 120 (relative to FIG. 5A) while remaining in the plane of the platform 110 and equidistant from the edges of the platform 110. Similarly, FIG. 5F illustrates a sixth state of the piezoelectric cantilevers 150 in which the first piezoelectric cantilever 150a and second piezoelectric cantilever 150b are rolled inward towards the ring resonator 120 (relative to FIG. 5A) while remaining in the plane of the platform 110 and equidistant from the edges of the platform 110. When rolling the piezoelectric cantilevers 150, the electrodes 160 apply an electric field that adjusts the relative alignment and/or distance between the respective optical couplers by causing the respective piezoelectric cantilever 150 to move a first side of the piezoelectric cantilever 150 closer to the ring resonator 120 and move a second side (opposite to the first side) of the piezoelectric cantilever 150 further from the ring resonator 120 relative to the plane of the platform 110. Stated differently, the piezoelectric cantilever 150 rotates about the Y axis when rolled.

Although FIGS. 5A-5F illustrate how an operator may pitch, yaw, or roll a piezoelectric cantilever 150 to adjust the coupling strength between a given selective waveguide 140 and the ring resonator by changing the associated alignment and/or distance or amount of overlap between the pair of optical couplers, combinations of two or more of yawing, pitching, and rolling a given piezoelectric cantilever 150 are contemplated. Similarly, although FIGS. 5A-5F illustrate two piezoelectric cantilevers 150 performing similar movements (e.g., both yawing, both pitching, both rolling), an operator may move each piezoelectric cantilever 150 independently of the other piezoelectric cantilevers 150, and a given piezoelectric cantilever 150 may remain stationary, yaw, pitch, or roll while another piezoelectric cantilever 150 may move (or not move) according to a different movement pattern.

Additionally or alternatively, when the optical device includes an adjustable bus waveguide 130 (e.g., mounted to piezoelectric carrier 180 controllable by bus electrodes 170), the operator may pitch, roll, or pitch and roll the piezoelectric carrier 180 to move the bus waveguide 130 closer to or further from the ring resonator 120 such as in FIGS. 5C-5F.

Figure 6:
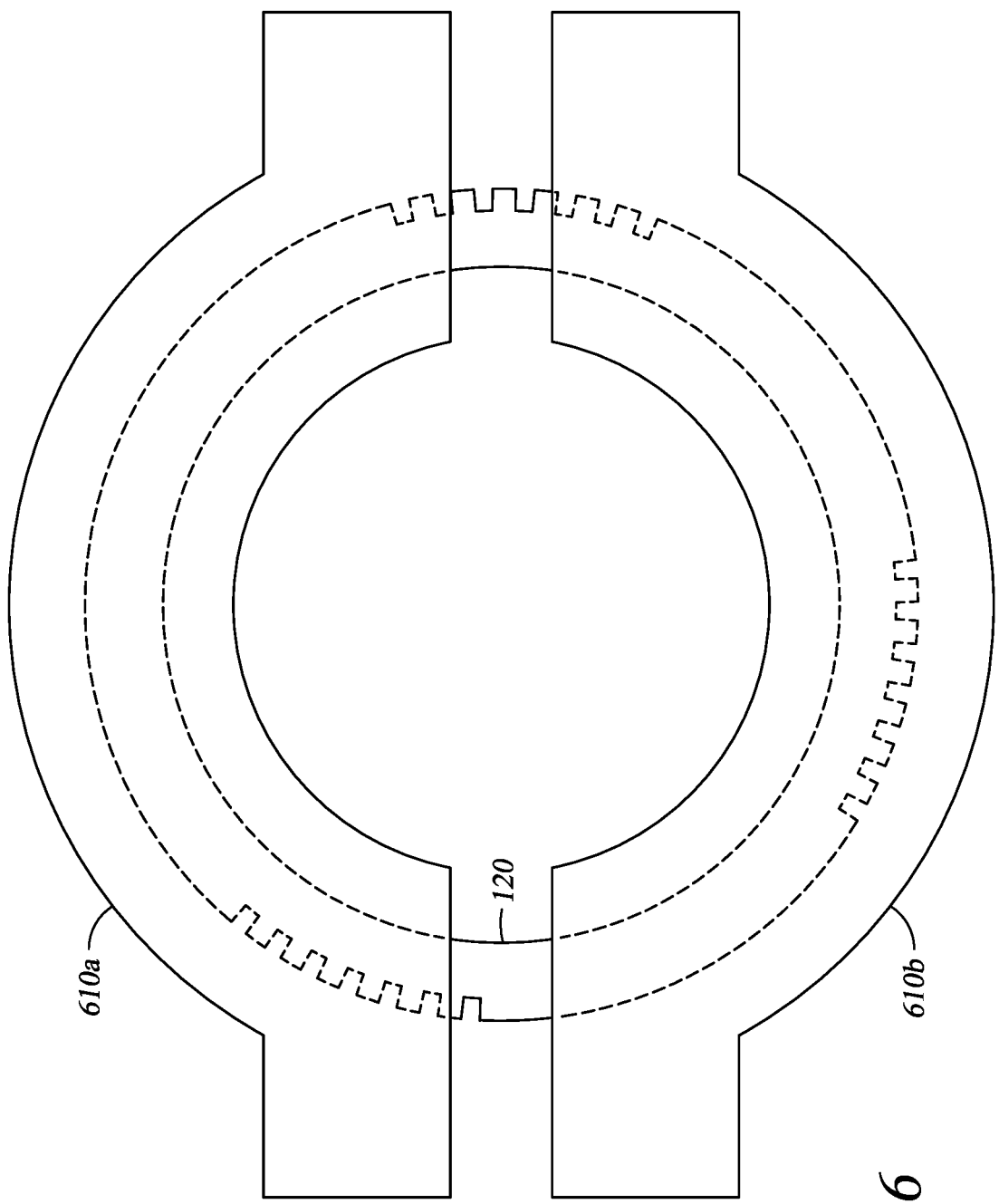
FIG. 6 illustrates wavelength tuners in relation to the ring resonator, according to embodiments of the present disclosure.

FIG. 6 illustrates wavelength tuners 610a-b (generally or collectively, wavelength tuner 610) in relation to the ring resonator 120, according to embodiments of the present disclosure. In various embodiments the wavelength tuners 610 are metallic resistors that are defined in a plane above or below the ring resonator 120 (in the Z direction) in the optical device that are supplied with a controllable current to generate heat. The generated heat is radiated to the ring resonator 120 to change the temperature of the ring resonator 120 and thereby change the refractive index of the ring. The operator may control the amount of current supplied to the wavelength tuners 610 to ensure that critical coupling is met at the interface between the bus waveguide 130 and the ring resonator 120 to enable the optical device to operate across a wide range of wavelengths.

Figure 7:
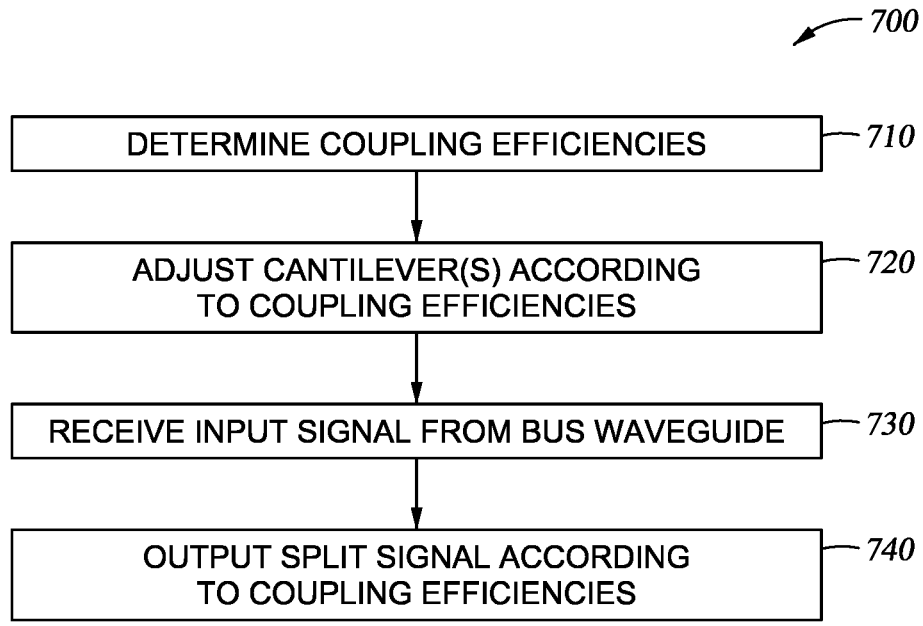
FIG. 7 is a flowchart for using an optical device for splitting optical signals, according to embodiments of the present disclosure.

FIG. 7 is a flowchart of a method 700 for using an optical device for splitting optical signals, according to embodiments of the present disclosure. Method 700 begins with block 710, where the optical device determines coupling percentages for a given pair of optical couplers for an optical device. In various embodiments, the determined coupling percentages can be specified by a human operator to define a desired splitting ratio, a microcontroller on the optical device or a calibration system external to the optical device (such as a computing device 900 described in relation to FIG. 9) that recalibrates a desired splitting level based on manufacturing variability in the optical device, or combinations thereof.

For example, a human operator may specify that a given optical device with three selective waveguides 140 should have a splitting ratio of 1:1:1, and each selective waveguide 140 is therefore nominally set to receive one third of the input optical power. However, if during test and calibration, variations in the ring resonator 120, the selective waveguides 140, or various components that receive signals from the selective waveguides 140 indicate that the nominal coupling percentages provide too much optical power or not enough optical power to various downstream components, the microcontroller or calibration system can bring the effects back into tolerance by further adjusting the splitting ratio.

For example, when the first selective waveguide 140a and second selective waveguides 140b receive too strong of a signal, or the third selective waveguide 140c receives too weak of a signal, the microcontroller or calibration system adjusts the splitting ratio from 1:1:1 to 1:1:2. To change the splitting ratio, the nominal coupling efficiency may be increased or decreased in one or more pairs of optical couplers. In various embodiments, the microcontroller may adjust one or more of the selective waveguides to have stronger or weaker coupling efficiencies to respectively accept a greater or lesser percentage of the incoming signal power. Consider then that two otherwise identical selective waveguides 140, when set to equal coupling efficiencies (with no other selective waveguides 140 coupled with the ring resonator 120), each receive 50% of the incoming optical signal strength. However, when a first selective waveguide 140a of the two otherwise identical selective waveguides 140 is set at half of its original coupling efficiency, the first selective waveguide 140a receives 33% of the incoming optical signal strength and the second selective waveguide 140b receives 66% of the incoming optical signal strength.

Accordingly, a microcontroller may make various adjustments to the coupling efficiencies of the selective waveguides 140 to affect various desired signal optical power splitting ratios. For example, when in a base state each pair of optical couplers is coupled at X% of nominal coupling efficiency to each nominally receive 33% of the incoming signal power, the microcontroller or calibration system can adjust the first selective waveguide 140a and second selective waveguides 140b to Y% efficiency (where Y<X, to receive 25% of the incoming signal power) and leave the third selective waveguide coupled at X% efficiency (to now receive the remaining 50% of the incoming signal power) to affect a 1:1:2 splitting ratio instead of a 1:1:1 splitting ratio. In another example, the microcontroller or calibration system can leave the first selective waveguide 140a and second selective waveguides 140b to X% coupling efficiency and adjust the third selective waveguide to 2*X% coupling efficiency to affect a 1:1:2 splitting ratio instead of a 1:1:1 splitting ratio. In a further example, the microcontroller or calibration system can adjust the first selective waveguide 140a and second selective waveguides 140b to 0.8*X% coupling efficiency and adjust the third selective waveguide to be 1.6*X% coupling efficiency to affect a 1:1:2 splitting ratio instead of a 1:1:1 splitting ratio.

In another example, an optical device may nominally provide a 1:1:1 splitting ratio, and the user may desire 1:1 splitting ratio; omitting one of the selective waveguides 140 as an output path (e.g., 1:1:0). Accordingly, the human operator may designate one selective waveguide 140 to have zero coupling efficiency with the ring resonator 120 and leave the other two selective waveguides 140 coupled at a nominal coupling percentage.

As will be appreciated, the examples given for 1:1:1 nominal splitting ratios and 1:1:2 and 1:1:0 effective splitting ratios are provided as non-limiting illustrations of the capabilities of the optical device described herein. Various different nominal splitting ratios using more or fewer coupling pairs at different relative values may be adjusted to various different effective splitting ratios. Additionally or alternatively, the adjustments to coupling efficiencies may be used to correct for out-of-tolerance components that would nominally use a first splitting ratio at an initial coupling efficiency, but are adjusted to provide a second splitting ratio that accounts for the out-of-tolerance components to bring the performance of those components back into tolerance for downstream components that receive inputs from the out-of-tolerance components.

At block 720, the optical device adjusts one or more piezoelectric cantilevers 150 according to the coupling efficiencies identified per block 710. In various embodiments, a microcontroller or calibration system translates the desired (or adjusted) coupling efficiency to one or more voltages that one or more respective voltage sources 430 apply to the electrodes 160 of the associated piezoelectric cantilevers 150 for the selective waveguides 140. By moving the associated piezoelectric cantilevers 150, the second optical coupler 141 included in the selective waveguide 140 changes location relative to the first optical coupler 121 included in the ring resonator 120. Thus the ring resonator 120 and the moved selective waveguide 140 form a stronger or weaker coupled connection relative to when the piezoelectric cantilever 150 is in a resting state.

In various embodiments, the microcontroller or calibration system may move the piezoelectric cantilever 150 from the resting state to adjust the effective coupling efficiency by one or more of yawing, pitching, or rolling the piezoelectric cantilever 150 to change a relative alignment and/or distance or overlapping surface area of the first optical coupler 121 with the second optical coupler 141. Similarly, the microcontroller or calibration system may move the piezoelectric carrier 180 from the resting state to adjust the effective coupling efficiency by one or more of pitching or rolling the piezoelectric carrier 180 to change a relative alignment and/or distance or overlapping surface area of the evanescently coupled regions of the bus waveguide 130 and the ring resonator 120.

In various embodiments, after moving the piezoelectric cantilevers 150 and/or carrier 180 into desired positions, the fabricator may fix the positions of the various MEMS actuated components by applying an epoxy or other material in the trenches 111 and bus trench 112 to hold the piezoelectric cantilevers 150 and carrier 180 in place. Once held in place by the epoxy or other material, the fabricator may remove the applied voltages from the respective electrodes. Accordingly, the fabricator may define specific morphologies for the various waveguides to couple with the ring resonator 120 and hold those morphologies in place after an initial calibration without having to continuously supply voltage to affect the actuation. Beneficially, the application of the epoxy or other material consumes less power, and reduces noise in the optical signals (e.g., due to minor mechanical movement of the piezoelectric cantilevers 150 or carrier 180) compared to active control of the MEMS actuated components during operations, while still allowing the fabricator to adjust a base design of an optical device for specific use cases or to compensate for manufacturing tolerances.

At block 730, the optical device receives an input signal from a bus waveguide 130 at the ring resonator 120.

At block 740, the optical device outputs the split signals from the ring resonator 120 according to the coupling percentages onto the selective waveguides 140. Depending on the coupling percentages set for the individual selective waveguides 140, each waveguide may receive between 0-100% of the input signal, which is then carried to any downstream devices that receive inputs from the respective selective waveguides 140.

Figure 8:
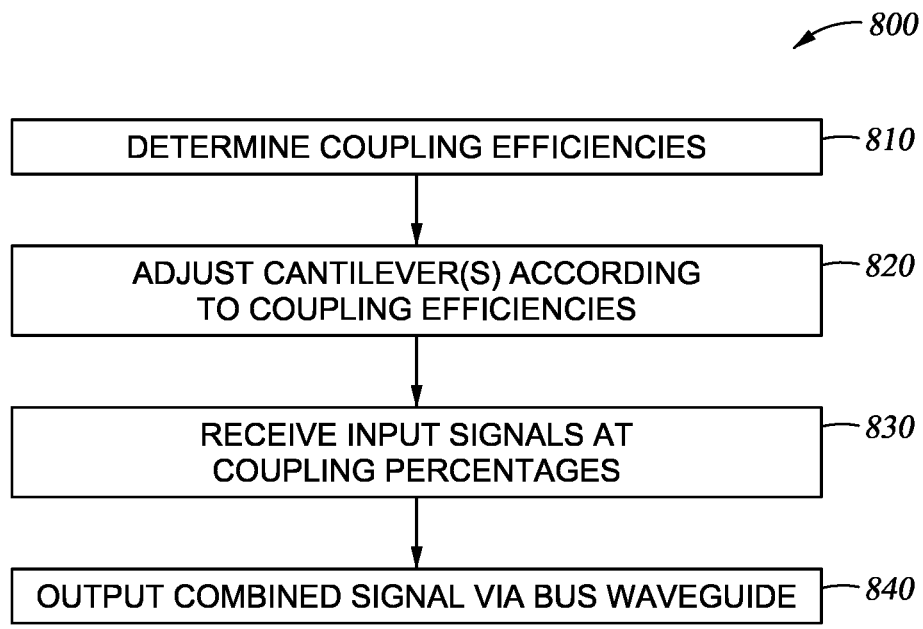
FIG. 8 is a flowchart for using an optical device for combining optical signals, according to embodiments of the present disclosure.

FIG. 8 is a flowchart of a method 800 for using an optical device for combining optical signals, according to embodiments of the present disclosure. Method 800 begins with block 810, where the optical device determines coupling percentages for a given pair of optical couplers for an optical device. In various embodiments, the determined coupling percentages can be specified by a human operator to define a desired combining ratio, a microcontroller on the optical device or a calibration system external to the optical device (such as a computing device 900 described in relation to FIG. 9) that recalibrates a desired combining level based on manufacturing variability in the optical device, or combinations thereof.

For example, a human operator may specific that a given optical device with three selective waveguides 140 should have a combining ratio of 1:1:1, and each selective waveguide 140 is therefore nominally set to provide one third of the input optical power to the ring resonator 120. However, if during test and calibration, variations in the ring resonator 120, the selective waveguides 140, or various components that provide signals to the selective waveguides 140 indicate that the nominal coupling percentages provide too much optical power or not enough optical power to various downstream components from the bus waveguide 130, the microcontroller or calibration system can bring the effects back into tolerance by further adjusting the splitting ratio.

In various embodiments, the microcontroller may adjust one or more of the selective waveguides 140 to have stronger or weaker coupling efficiencies to respectively provide a greater or lesser percentage of the outgoing signal power. Consider then that two otherwise identical selective waveguides 140, when set to equal coupling efficiencies (with no other selective waveguides 140 coupled with the ring resonator 120) and carrying input signals at an equal strength, each input 50% of the outgoing optical signal strength provided to the bus waveguide 130. However, when a first selective waveguide 140a of the two otherwise identical selective waveguides 140 is set at half of its original coupling efficiency, the first selective waveguide 140a inputs 33% of the outgoing optical signal strength and the second selective waveguide 140b inputs 66% of the outgoing optical signal strength.

Accordingly, a microcontroller may make various adjustments to the coupling efficiencies of the selective waveguides 140 to affect various desired signal optical power splitting ratios. For example, when the first selective waveguide 140a and second selective waveguides 140b input too strong of signals, or the third selective waveguide 140c inputs too weak of a signal, the microcontroller or calibration system adjusts the combining ratio from 1:1:1 to 1:1:2. To change the combining ratio, the nominal coupling efficiency may be increased or decreased in one or more pairs of optical couplers. For example, when in a base state each pair of optical couplers is coupled at X% coupling efficiency, the microcontroller or calibration system can adjust the first selective waveguide 140a and second selective waveguides 140b to 0.5*X% coupling efficiency and leave the third selective waveguide coupled at X% coupling efficiency to affect a 1:1:2 combining ratio instead of a 1:1:1 combining ratio. In another example, the microcontroller or calibration system can leave the first selective waveguide 140a and second selective waveguides 140b at X% coupling efficiency and adjust the third selective waveguide to 2*X% coupling efficiency to affect a 1:1:2 combining ratio instead of a 1:1:1 combining ratio. In a further example, the microcontroller or calibration system can adjust the first selective waveguide 140a and second selective waveguides 140b to 0.8*X% coupling efficiency and adjust the third selective waveguide to 1.6*% coupling efficiency to affect a 1:1:2 combining ratio instead of a 1:1:1 combining ratio. Accordingly, by adjusting one or more coupling efficiencies from a baseline coupling efficiency to produce a 1:1:2 combining ratio, the microcontroller or calibration system induces the optical device to produce the intended effects of a 1:1:1 combining ratio when the optical device would otherwise be out of tolerance.

In another example, an optical device may nominally provide a 1:1:1 combining ratio, and the user may desire 1:1 combining ratio; omitting one of the selective waveguides 140 as an input path (e.g., 1:1:0). Accordingly, the human operator may designate one selective waveguide 140 to have zero coupling efficiency with the ring resonator 120 and leave the other two selective waveguides 140 coupled at a nominal coupling efficiency.

As will be appreciated, the examples given for 1:1:1 nominal combining ratios and 1:1:2 and 1:1:0 effective combining ratios are provided as non-limiting illustrations of the capabilities of the optical device described herein. Various different nominal combining ratios using more or fewer coupling pairs at different relative coupling efficiency values may be adjusted to various different effective combining ratios.

At block 820, the optical device adjusts one or more piezoelectric cantilevers 150 according to the coupling percentages identified per block 810. In various embodiments, a microcontroller or calibration system translates the desired (or adjusted) coupling percentage to one or more voltages that one or more respective voltage sources 430 apply to the electrodes 160 of the associated piezoelectric cantilevers 150 for the selective waveguides 140. By moving the associated piezoelectric cantilevers 150, the second optical coupler 141 included in the selective waveguide 140 changes location relative to the first optical coupler 121 included in the ring resonator 120. Thus the ring resonator 120 and the moved selective waveguide 140 form a stronger or weaker coupled connection relative to when the piezoelectric cantilever 150 is in a resting state. Similarly, the microcontroller or calibration system may move the piezoelectric carrier 180 from the resting state to adjust the effective coupling efficiency by one or more of pitching or rolling the piezoelectric carrier 180 to change a relative alignment and/or distance or overlapping surface area of the evanescently coupled regions of the bus waveguide 130 and the ring resonator 120.

In various embodiments, after moving the piezoelectric cantilevers 150 and/or carrier 180 into desired positions, the fabricator may fix the positions of the various MEMS actuated components by applying an epoxy or other material in the trenches 111 and bus trench 112 to hold the piezoelectric cantilevers 150 and carrier 180 in place. Once held in place by the epoxy or other material, the fabricator may remove the applied voltages from the respective electrodes. Accordingly, the fabricator may define specific morphologies for the various waveguides to couple with the ring resonator 120 and hold those morphologies in place after an initial calibration without having to continuously supply voltage to affect the actuation. Beneficially, the application of the epoxy or other material consumes less power, and reduces noise in the optical signals (e.g., due to minor mechanical movement of the piezoelectric cantilevers 150 or carrier 180) compared to active control of the MEMS actuated components during operations, while still allowing the fabricator to adjust a base design of an optical device for specific use cases or to compensate for manufacturing tolerances In various embodiments, the microcontroller or calibration system may move the piezoelectric cantilever 150 from the resting state to adjust the effective coupling percentage by one or more of yawing, pitching, or rolling the piezoelectric cantilever 150 to change a relative alignment and/or distance or overlapping surface area of the first optical coupler 121 with the second optical coupler 141.

At block 830, the optical device receives one or more input signals according to the coupling percentages from the selective waveguides 140.

At block 840, the optical device outputs the combined output signals from the ring resonator 120 onto the bus waveguide 130. Depending on the coupling percentages set for the individual selective waveguides 140, each waveguide may input between 0-100% of optical power that is provided in the combined signal output to the bus waveguide 130. The bus waveguide 130 receives the combined signal and carries the combined signal to any downstream devices that receive inputs from the bus waveguide 130.

FIG. 9 illustrates hardware of a computing device 900 such as can be included as a microcontroller for the optical device or as a calibration and test system for an optical device, as described herein. The computing device 900 includes a processor 910, a memory 920, and communication interfaces 930. The processor 910 may be any processing element capable of performing the functions described herein. The processor 910 represents a single processor, multiple processors, a processor with multiple cores, and combinations thereof. The communication interfaces 930 facilitate communications between the computing device 900 and other devices. The communication interfaces 930 are representative of wireless communications antennas (both omnidirectional and directional), various steering mechanisms for the antennas, and various wired communication ports including out-pins and in-pins to a microcontroller. The memory 920 may be either volatile or non-volatile memory and may include RAM, flash, cache, disk drives, and other computer readable memory storage devices. Although shown as a single entity, the memory 920 may be divided into different memory storage elements such as RAM and one or more hard disk drives.

As shown, the memory 920 includes various instructions that are executable by the processor 910 to provide an operating system 921 to manage various functions of the computing device 900 and one or more applications 922 to provide various functionalities to users of the computing device 900, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
a bus waveguide disposed on a platform;
a ring resonator disposed on the platform, including at least a first optical coupler, wherein the ring resonator is optically coupled with the bus waveguide; and
a selective waveguide disposed on a piezoelectric cantilever mounted in a trench defined in the platform, wherein the selective waveguide includes a second optical coupler and is controllable to selectively adjust a coupling ratio between the first optical coupler with the second optical coupler by physically changing a distance between the first optical coupler and the second optical coupler.

2. The system of claim 1, further comprising:
a third optical coupler included in the ring resonator; and
a second selective waveguide formed on a second piezoelectric cantilever mounted on one side to the platform in a second trench defined in the platform, wherein the second selective waveguide includes a fourth optical coupler and is controllable to selectively couple and decouple the third optical coupler with the fourth optical coupler by physically changing a second distance between the third optical coupler and the fourth optical coupler.

3. The system of claim 2, wherein the bus waveguide carries an input signal coupled into the ring resonator and that is provided as output to the selective waveguide and the second selective waveguide to operate the system as an optical power splitter.

4. The system of claim 3, wherein the distance and the second distance are independently controllable from one another to adjust a percentage of the input signal split between the selective waveguide and the second selective waveguide.

5. The system of claim 4, wherein a first percentage of the input signal provided to the selective waveguide is zero percent.

6. The system of claim 2, wherein the selective waveguide couples a first input signal into the ring resonator and the second selective waveguide couples a second input signal into the ring resonator to operate the system as an optical power combiner that provides a combined output signal from the ring resonator to the bus waveguide.

7. The system of claim 1, wherein the first optical coupler and the second optical coupler are Distributed Bragg Gratings (DBG).

8. The system of claim 1, wherein the piezoelectric cantilever includes a first electrode and a second electrode on a side of the piezoelectric cantilever mounted to the platform that are configured to deflect the piezoelectric cantilever to physically change the distance between the first optical coupler and the second optical coupler in response to an applied voltage.

9. The system of claim 1, wherein the piezoelectric cantilever is deflectable to physically change the distance between the first optical coupler and the second optical coupler by at least two of:
pitching upward from a plane defined by the platform;
pitching downward from the plane defined by the platform;
bending inward towards the ring resonator in the plane defined by the platform; and
bending outward away the ring resonator in the plane defined by the platform.

10. A device, comprising:
a platform, defining a first trench and a second trench;
a first piezoelectric cantilever connected on one end to the platform within the first trench;
a second piezoelectric cantilever connected on one end to the platform within the second trench;
a ring resonator connected to the platform between the first trench and the second trench;
a first selective waveguide disposed on the first piezoelectric cantilever and the platform;
a second selective waveguide disposed on the second piezoelectric cantilever and the platform; and
a bus waveguide disposed on the platform and optically coupled with the ring resonator.

11. The device of claim 10, wherein the first piezoelectric cantilever includes a first curved section matched to an outer curvature of the ring resonator, and wherein the second piezoelectric cantilever includes a second curved section matched to the outer curvature of the ring resonator.

12. The device of claim 11, wherein the first selective waveguide includes a first optical coupler disposed within the first curved section to selectively couple with a second optical coupler disposed on the outer curvature of the ring resonator, and wherein the second selective waveguide includes a third optical coupler disposed within the second curved section to selectively couple with a fourth optical coupler disposed on the outer curvature of the ring resonator.

13. The device of claim 12, wherein the bus waveguide is optically coupled to the ring resonator at a first location, wherein the first location is located at a given arc distance clockwise to the second optical coupler and the given arc distance counterclockwise to the fourth optical coupler.

14. The device of claim 10, further comprising:
a first electrode pair located on the first piezoelectric cantilever where the first piezoelectric cantilever is connected to the platform; and
a second electrode pair located on the second piezoelectric cantilever where the second piezoelectric cantilever is connected to the platform.

15. An optical signal processor, comprising:
a bus waveguide disposed in a first plane;
a ring resonator disposed in the first plane and optically coupled with the bus waveguide, the ring resonator including a plurality of first optical couplers; and
a plurality of selective waveguides, wherein each selective waveguide of the plurality of selective waveguides comprises:
a second optical coupler corresponding to one first optical coupler of the plurality of first optical couplers; and
a piezoelectric cantilever configured to adjust a relative alignment between the second optical coupler and the corresponding one first optical coupler to selectively adjust a coupling efficiency between each selective waveguide with the ring resonator.

16. The optical signal processor of claim 15, wherein each piezoelectric cantilever is configured to adjust the relative alignment between the second optical coupler and the corresponding one first optical coupler by:
yawing a free distal end of the piezoelectric cantilever in the first plane relative to a connected end of the piezoelectric cantilever that is connected to a platform on which the ring resonator is disposed, wherein the free distal end is held in free space.

17. The optical signal processor of claim 15, wherein each piezoelectric cantilever is configured to adjust the relative alignment between the second optical coupler and the corresponding one first optical coupler by:
pitching a free distal end of the piezoelectric cantilever away from the first plane relative to a connected end of the piezoelectric cantilever that is connected to a platform on which the ring resonator is disposed, wherein the free distal end is held in free space.

18. The optical signal processor of claim 15, wherein each piezoelectric cantilever is configured to adjust the relative alignment between the second optical coupler and the corresponding one first optical coupler by:
rolling the piezoelectric cantilever, wherein a first side of the piezoelectric cantilever closer to the ring resonator moves in an opposite direction to a second side of the piezoelectric cantilever further from the ring resonator relative to the first plane.

19. The optical signal processor of claim 15, wherein each piezoelectric cantilever further comprises:
electrodes disposed a connected side of the piezoelectric cantilever that is connected to a platform on which the ring resonator is disposed.

20. The optical signal processor of claim 15, wherein each second optical coupler and the plurality of first optical couplers are Distributed Bragg Gratings (DBG).

\* \* \* \* \*